UNITED STATES PATENT OFFICE.

CHARLES METTLER, OF MUNICH, GERMANY.

PROCESS FOR THE PRODUCTION OF AROMATIC ALCOHOLS AND THEIR DERIVATIVES.

No. 12,654. Specification of Reissued Letters Patent. Reissued May 21, 1907.

Original No. 815,548, dated March 20, 1906. Application for reissue filed June 29, 1906. Serial No. 324,096.

*To all whom it may concern:*

Be it known that I, CHARLES METTLER, a citizen of Switzerland, of No. 12 Marsstrasse, Munich, in the Kingdom of Bavaria and German Empire, have invented certain new and useful Improvements in Processes for the Production of Aromatic Alcohols and their Derivatives, of which the following is a specification.

It has not hitherto been known that a reduction of aromatic esters to alcohols, for example, of the ethyl-ester of benzoic acid to benzylalcohol $$C_6H_5COOC_2H_5+4H=C_6H_5.CH_2OH+C_2H_5OH$$

could be realized.

I have now discovered that aromatic esters have the property, under the conditions suitable for the same, of taking up hydrogen and changing into compounds comparatively poor in oxygen. This occurs when aromatic esters are electrolytically reduced at metal cathodes of high cathodic tension, for example, at lead cathodes. For this purpose it is advantageous to employ a dissolving agent for the ester, which is at the same time capable of conducting the electric current, such for instance as concentrated sulfuric acid, and this can be diluted with water, alcohol, or acetic acid. In lieu thereof an aqueous alcoholic solution of hydrochloric acid can be employed, and finally such a reduction can also be carried out in an alkaline, or neutral, solution, in which case an aqueous solution which contains the electrolyte is mixed with the quantity of alcohol necessary for the solution of the ester. When working in acid solution and reducing, for example, the ethyl ester of benzoic acid, after passing the current for a sufficient time, the whole of the ester disappears, and in its stead a new reaction product is obtained in approximately quantitative yield. The product consists partly of benzyl alcohol and partly of benzylethylether, which latter boils at a temperature of about one hundred and eighty-five (185) degrees centigrade and is formed according to the following equation.

$$C_6H_5.COOC_2H_5+4H=C_6H_5.C\begin{matrix}H\\H\\OC_2H_5\end{matrix}+H_2O$$

while the formation of the benzyl alcohol takes place according to the equation $$C_6H_5.COOC_2H_5+4H=C_6H_5.CH_2OH+C_2H_5OH.$$

In a similar manner benzylalcohol and benzylmethylether (boiling point one hundred and sixty-eight (168) degrees centigrade) can be obtained from the methyl ester of benzoic acid $$C_6H_5.C\begin{matrix}O\\OCH_3\end{matrix} \rightarrow C_6H_5.CH_2OH,\quad C_6H_5.C\begin{matrix}O\\OCH_3\end{matrix} \rightarrow C_6H_5.CH_2OCH_3$$

My invention is not limited to the various esters of benzoic acid, but it relates generally to the whole class of aromatic esters. It is particularly of value in that it is also available for substituted aromatic esters. Thus when using halogen-substituted esters of benzoic acid the halogen is not replaced by hydrogen, but the latter is used up exclusively in reducing the carboxyl group. For example, according to my invention, the reactions illustrated by the following formulæ can be carried out:

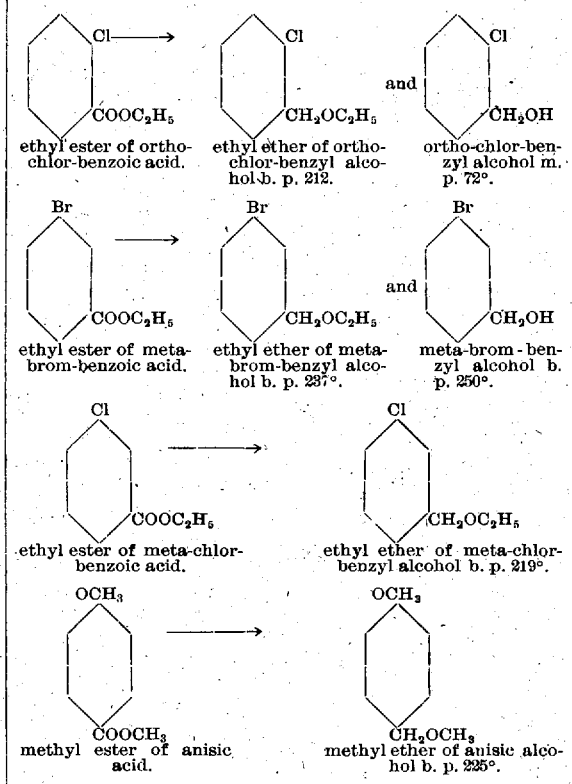

ethyl ester of ortho-chlor-benzoic acid. ethyl ether of ortho-chlor-benzyl alcohol b. p. 212. ortho-chlor-benzyl alcohol m. p. 72°.

ethyl ester of meta-brom-benzoic acid. ethyl ether of meta-brom-benzyl alcohol b. p. 237°. meta-brom-benzyl alcohol b. p. 250°.

ethyl ester of meta-chlor-benzoic acid. ethyl ether of meta-chlor-benzyl alcohol b. p. 219°.

methyl ester of anisic acid. methyl ether of anisic alcohol b. p. 225°.

The relative quantities of alcohol and ether produced vary in different cases and appear to depend upon the constitution of the compound being reduced. Thus, when reducing the methyl-ester of benzoic acid according to the conditions described under the following Example 1, about twice as much alcohol as ether is formed, whereas under similar conditions the ethyl-ester of benzoic acid gives rise to twice as much ether as alcohol. Upon reducing the phenyl-ester of benzoic acid, the ether is obtained as the chief product (see the following Example 2) and alcohol is only formed in very small quantities. By the reduction of halogen-substituted compounds, the ether is chiefly formed, for instance the ethyl ester of meta-chlor-benzoic acid, upon reduction, yields solely meta-chlor-benzyl-ethyl-ether. The reduction of the esters can also be carried out in alkaline solution, in which case alcohols are formed.

The ethers and the alcohols can, by means of suitable oxidizing agents, be easily converted into aldehydes and these form suitable initial materials for the preparation of coloring matters, such as the tri-phenyl methane coloring matters, and artificial indigo. Many of the reduction products of aromatic esters are characterized by a pleasant odor and can be used in the manufacture of perfumes.

The following are examples of methods in which my invention may be carried into practical effect, but my invention is not confined to these examples.

Example 1. Fill the cathode compartment of an electrolytic apparatus with a solution composed of three hundred (300) grams of the ethylester of benzoic acid, three hundred and fifty (350) grams of concentrated sulfuric acid, five hundred (500) grams of ninety-six (96) per cent. alcohol and one hundred (100) grams of water. Instead of water, of course a correspondingly diluted sulfuric acid can be employed. The anode compartment, which is separated from the cathode compartment by means of a porous pot, should contain dilute sulfuric acid. The cathode should consist of pure sheet lead (preferably prepared according to the receipt given by Tafel in the *Berichte* vol. 33, p. 2215). The anode should consist of pure lead. Send through the liquid an electric current of seven (7) amperes per one hundred (100) square centimeters of the cathode surface. This current strength, however, can be considerably varied. Maintain the temperature, by cooling, at from twenty (20), to thirty (30), degrees centigrade. As soon as no more hydrogen is absorbed, neutralize the cathode liquid with thirty (30) per cent. caustic soda, whereupon two layers are formed, the upper layer containing alcohol and the reduction products of the ethyl ester of benzoic acid. Separate this upper layer and fractionate by distillation, whereupon benzyl-ethyl-ether (boiling point one hundred and eighty-four (184) degrees centigrade) and benzyl alcohol (boiling point two hundred and five (205) degrees centigrade) are obtained.

Example 2. Reduce a mixture of one hundred and seventy (170) grams of the ethyl-ester of meta-brom-benzoic acid with three hundred (300) grams of concentrated sulfuric acid and five hundred (500) grams of ninety-six (96) per cent. alcohol by means of an electric current and using a lead cathode as described in Example 1. During the electrolysis the reduction product separates out, principally at the bottom of the vessel, and can be run off and distilled. Meta-brom-benzyl-ethyl-ether distils between two hundred and thirty-five (235) and two hundred and thirty-nine (239) degrees centigrade, and at a temperature of two hundred and fifty (250) degrees centigrade, a small quantity of brom-benzyl-alcohol passes over.

Example 3. Introduce a solution of one hundred (100) grams of the ethyl-ester of benzoic acid, six hundred (600) grams of thirty (30) per cent. aqueous ammonia solution and six hundred (600) grams of alcohol into the cathode compartment of an electrolytic apparatus from which cathode compartment the anode compartment is separated by means of a porous pot, and contains either dilute sulfuric acid or ammonium sulfate solution. The cathode and the anode should consist of pure lead. Electrolize by means of a current of six (6) amperes per one hundred (100) square centimeters of the cathode surface, and, at the same time, keep the mixture cool. When no more hydrogen is absorbed, distil off the alcohol and acidify. The greater part of the benzyl alcohol separates out and can be removed and distilled. Its boiling point is one hundred and ninety-five (195) to two hundred and five (205) degrees centigrade.

What I claim is:

1. The process of producing aromatic alcohols and their ethers, which consists in exposing the aromatic esters in a dissolving agent, capable of conducting the electric current in the cathode-space of an electrolytic apparatus in using for the cathode a material of a specially-high cathodic tension, then neutralizing the cathode liquid, then separating the reaction product and finally distilling, substantially as described.

2. The process of producing aromatic alcohols and the corresponding ethers by electrolytically reducing aromatic esters making use of a cathode with a large excess of tension.

3. The process of producing aromatic alcohols and the corresponding ethers by electrolytically reducing aromatic esters making use of a lead cathode.

In testimony whereof I have signed my name to this specification in the presence of two subscribing witnesses.

CHARLES METTLER.

Witnesses:

ULYSSES J. BYWATER,
GEORG KÖNNER.